Figure 1:
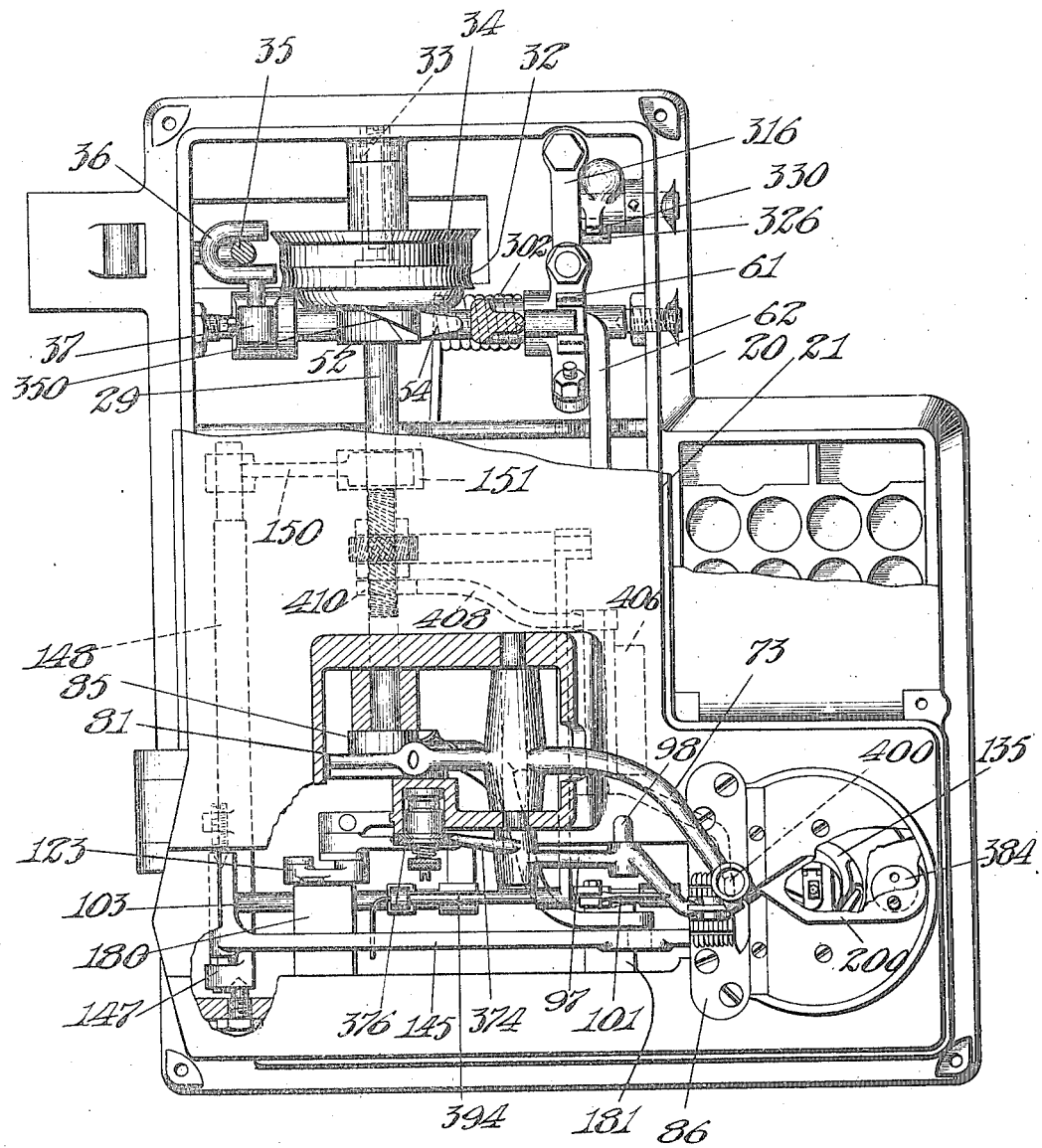

G. S. HILL.
CONTROLLING MECHANISM FOR DRIVING AND STOPPING BUTTONHOLE FINISHING OR OTHER MACHINES.
APPLICATION FILED MAR. 31, 1913.

1,180,646.

Patented Apr. 25, 1916.
2 SHEETS—SHEET 1.

WITNESSES
O. Blanche Hargraves
Elizabeth C. Corp

INVENTOR
George S. Hill
By his Attorney
Nelson W. Howard

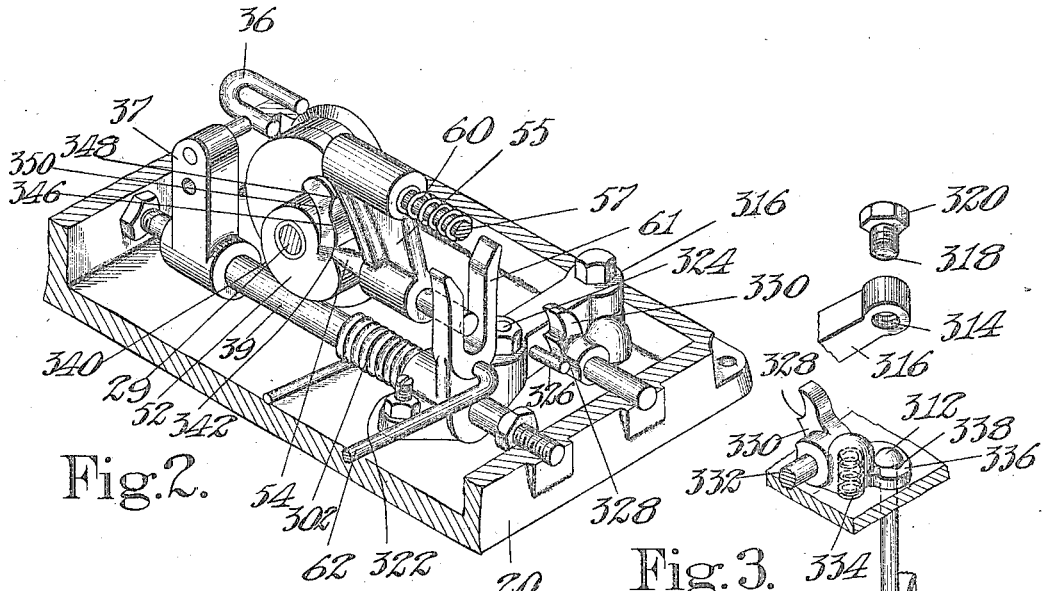
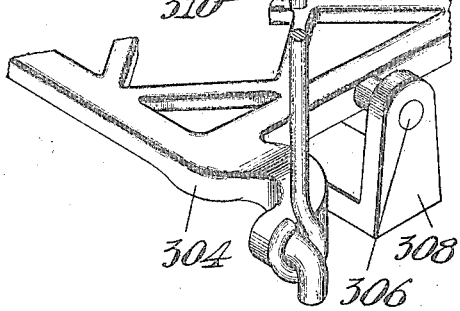

UNITED STATES PATENT OFFICE.

GEORGE S. HILL, OF BEVERLY, MASSACHUSETTS, ASSIGNOR TO UNITED SHOE MACHINERY COMPANY, OF PATERSON, NEW JERSEY, A CORPORATION OF NEW JERSEY.

CONTROLLING MECHANISM FOR DRIVING AND STOPPING BUTTONHOLE-FINISHING OR OTHER MACHINES.

1,180,646.      Specification of Letters Patent.      Patented Apr. 25, 1916.

Application filed March 31, 1913. Serial No. 757,891.

*To all whom it may concern:*

Be it known that I, GEORGE S. HILL, a citizen of the United States, residing at Beverly, in the county of Essex and State of Massachusetts, have invented certain Improvements in Controlling Mechanism for Driving and Stopping Buttonhole-Finishing or other Machines, of which the following description, in connection with the accompanying drawings, is a specification, like reference characters on the drawings indicating like parts in the several figures.

The invention relates to mechanism for controlling the starting and stopping of a machine, and particularly to a mechanism of this character which is controlled by the operator through a treadle or equivalent manually operated device.

Starting and stopping mechanisms such as are used on high speed sewing and other machines are frequently provided with belt or clutch shifters for throwing the power on and off which are automatically operated, as by a spring, to disconnect the power, and which require the operator to maintain the treadle or other operating device in position against the tension of the spring while the machine is running. Mechanisms of this character are also frequently provided with stopping devices for stopping the machine at a definite point in its cycle of operations which are also connected with the treadle, and are held out of operative relation by the operator against the tension of a spring which tends to automatically bring them into operative stopping relation. These mechanisms as heretofore constructed have put an undesirable strain upon the operator. When provided with stopping devices, these mechanisms are further objectionable for the reason that a comparatively slight releasing movement of the treadle may allow the stopping devices to contact or partially engage, and for the further reason that it is difficult for the operator to permit the quick movement of the stopping devices requisite for their most efficient operation.

It is accordingly the object of the present invention to provide a novel and improved controlling mechanism which will relieve the operator of the duty of maintaining the treadle or other operating device in position while the machine is running, and which, when embodied in a mechanism provided with stopping devices, will prevent premature engagement of the devices, and will insure their proper engagement when the machine is to be stopped.

To these ends the invention contemplates the provision of locking means for locking the shifter in position when moved by the operator, the unlocking movement of which is effected directly or indirectly by the treadle or other device through which the operator moves the shifter.

The invention also contemplates the provision in a mechanism comprising a belt or clutch shifter and stopping devices, the movements of which into driving positions are controlled by the operator, of locking means for the shifter and stopping devices, the unlocking movement of which is effected either directly or indirectly by the treadle or other device through which the operator causes the shifter and stopping devices to be shifted into driving positions. It is preferred to so construct the means for operating the locking devices that a movement of the treadle or similar operating device in a direction opposite to that in which it is moved to start the machine will cause the shifter, or the shifter and the stopping devices, to be released, and it is also preferred to effect the unlocking movement of the locking devices directly by the movement of the treadle, although these constructions are not essential to the invention in its broader aspects.

In addition to the features outlined above, the invention includes certain further novel features of construction and combinations of parts which are hereinafter described and set forth in the claims.

The various features of the invention will be readily understood from an inspection of the accompanying drawings, and the following detailed description of the mechanism illustrated therein.

In the drawings, Figure 1 is a plan view of a buttonhole finishing machine provided with starting and stopping mechanism embodying the invention in its preferred form, certain parts of the machine being shown in section or entirely removed in order to show more clearly the parts beneath; Fig. 2 is a view in perspective showing portions of the mechanism for controlling the starting and stopping of the machine; and Fig. 3 is a similar view showing the treadle and other portions of the same mechanism, certain of the parts being shown disassembled in order to disclose more clearly their construction.

In the drawings the invention is shown as applied to a buttonhole finishing machine similar in general construction and mode of operation to the machine shown and described in Patent No. 1,080,341, December 2, 1913. This machine comprises a hollow base 20 and a hollow work support 21 hinged thereto, and carrying the main shaft 29 and the operating parts of the machine. The machine is provided with a bender carried upon a bender lever or carrier 73, the oscillation of which is effected by a double eccentric or cam 85 acting upon arms of the bender carrier, one of which, 81, is shown. The work support 21 is provided below the bender with a slotted throat plate 86 into which the work is bent by the bender. The stitch forming mechanism comprises an eye-pointed needle 101 secured to a carrier—both of which are vibrated laterally about the longitudinally reciprocating needle bar 103 reciprocating in two brackets 180 and
181. The machine is also provided with a takeup 123, a shuttle 135, a thrum gatherer 200, and a feed dog which is secured to a feed bar 145, and is operated through suitable connections 147, 148 and 150 from a cam 151 on the driving shaft.

The mechanism for driving the shaft 29 comprises a pulley 32 secured to the end of the shaft, and located in axial alinement with a loose pulley 34 journaled upon a fixed stud 33. The driving belt 35 may be shifted from one pulley to the other to throw the power on or off by belt shifting mechanism comprising a shifter 36 secured to an arm 37 which is fixed to a rock shaft 39. The shaft 29 is stopped in a definite position when the power is thrown off by stopping devices comprising a stop cam 52 and a coöperating stop pin or member 54 secured at the lower end of an arm 55 which is fixed to a shaft 57. The shaft 57 is acted upon by a spring 60 which tends to swing the stop pin and shaft, and also to move them longitudinally toward the operative face of the stop cam. The stop pin projects at its forward end into the space between the forks of a bifurcated lever 61 secured to the rock shaft 39. The belt shifter 36 and the stop member 54 are shifted in one direction when the machine is to be stopped, by a coiled spring 302, which also tends normally to hold these parts in position so that the machine will remain at rest. The throwing of the machine into operation is effected by the operator, who presses the rear portion of the treadle or plate 304 with the toe of her foot, this treadle being pivoted at approximately its median line upon a fulcrum 306 supported in a bracket 308. A treadle rod 310 has an enlargement or head 312 at its upper end which enters a hole 314 (in one end of a projecting arm 316 secured to the rock shaft 39, before referred to. When the rod 310 is lifted, the head 312 acts upon the concave end 318 of a screw 320 threaded into the hole 314 so that, as the rear end of the treadle is depressed, the shifter actuator lever 316 is raised against the resistance of the spring 302 to shift the belt 35 to the driving pulley 32, while at the same time the stop member 54 is swung out of the path of the stop cam 52. Adjustable stops 322, 324 are provided upon the two sides of the lever 316 and are adapted to engage the base 20 so as to limit the movement of the actuator lever 316 in both directions. This lever is provided with a pin 326, which, as the parts are shifted into position to drive the machine, passes above a shoulder 328 of a locking latch 330 pivoted upon a pin 332 extending laterally from the base of the machine. A spring 334 acting upon the rear end of the latch tends constantly to throw the shoulder 328 to the left, as shown in Fig. 2, so that after the pin 326 passes above the shoulder the latter will automatically hold the parts in position so that the machine will be driven. With this construction, therefore, it is unnecessary for the operator to keep her foot upon the treadle in order to maintain the machine continuously in operation. The latch is provided with a tail 336 having a slot 338 through which the rod 310 passes. The shoulder under the head 312 engages this tail when the operator depresses the forward side of the treadle with the heel of her foot, thus withdrawing the shoulder 328 of the latch from the pin 326, whereupon the spring 302 acts upon the shifting member 36, 37, 39 to throw the belt upon the loose pulley, permitting the stopping mechanism 52, 54 to bring the machine to rest with the parts in a predetermined position, as will be further explained.

The stop cam 52 has a shape substantially the same as the stop cam described and claimed in Letters Patent of the United States No. 1,080,342, dated December 2, 1913, to Hill. The peripheral or acting surface of this cam, along which the stop pin 54 travels, includes an eccentric portion 340, and, owing to the resistance of the spring 60, the speed of the machine is greatly reduced as this portion 340 acts upon the pin. When, during the travel of the cam under the pin, the pin passes over the highest part of this eccentric portion, it drops into a depression 342 and then, if the momentum of the machine is sufficient, another eccentric portion 346 of the cam surface runs under the pin 54, still further compressing the spring 60. At the end of this eccentric surface is a surface 348, nearly at right angles to the shaft 29, which is intended to form a substantially positive abutment or final stop for the pin 54, so that when the stopping mechanism is rendered operative, even if the machine is running at high speed, the cam 52 can not overrun, carrying the abutment 348 beyond the pin 54. After the momentum of the machine has thus been absorbed, the cam 52, by reason of the sharp inclination of the eccentric portion 346, will be turned backward, owing to the pressure exerted by the spring 60 through the member 54, causing the machine to come to rest with the pin 54 resting in the depression 342. In this position the needle and bender will both be out of engagement with the work. The face of the cam 52 adjacent the eccentric portion 346 is, as shown in Figs. 1 and 2, inclined away from the plane of the remainder of the face, which plane is perpendicular to the axis of the shaft 29, so that a leading surface 350 is formed which permits the pin 54 to move laterally under the influence of the spring 302 to bring its end into operative engagement with the cam surface.

While the invention has been illustrated as applied to a buttonhole finishing machine, and as embodied in a mechanism in which the belt shifter throws the power on and off, it will be understood that the invention is applicable to other machines, and may be embodied in mechanism in which the power is thrown on or off by other forms of shifters.

It will also be understood that the specific construction and arrangement of parts shown and described is not essential to the broader features of the invention, and may be varied or modified as found desirable or best suited to the construction in which the invention is to be embodied.

Having explained the nature and object of the invention, and specifically described one form of mechanism in which it may be embodied, what is claimed is:—

1. In an organized machine, a driving shaft and means for connecting and disconnecting said shaft from a source of power comprising the combination of a shifting member and mechanism continuously under the control of the operator for moving said member in opposite directions and for then maintaining it automatically in positions respectively to maintain the shaft either connected to or disconnected from the source of power, said mechanism including a single treadle or lever and connections therefrom to said shifting member through which the operator may control the said action of said member and thereby the driving and stopping of the machine.

2. In an organized machine, a driving shaft and mechanism under the control of the operator for connecting said shaft to and disconnecting it from a source of power comprising the combination of a shifting member, a spring tending to move said member in one direction, a latch acting, when in one position, to prevent such movement, a treadle and a treadle rod constructed and arranged, when moved in one direction, to shift said member against the resistance of the spring and simultaneously to render the latch operative and, when moved in the opposite direction, to release the latch, allowing the shifting of said member by its spring.

3. In an organized machine, the combination of a driving shaft, mechanism under the control of the operator for connecting said shaft to and disconnecting it from a source of power comprising a shifting member provided with a radially projecting arm having an abutment thereon, adjustable stops for limiting the shifting movement of said member in both directions, means for shifting said member comprising a spring, a treadle plate pivoted intermediate opposite edges, a treadle rod connected thereto having a head for engaging said arm, a pivoted latch having a slotted tail for engaging the under side of said head and a spring tending to move said latch into engagement with said abutment for maintaining the machine in operation.

4. In an organized machine, the combination of a driving shaft, a driven pulley on the shaft and a loose pulley, a belt shifter (36—39), a spring (302) and a latch (330) for said belt shifter, a treadle (304) and connections therefrom to the belt shifter and latch, comprising a treadle rod (310) having a shouldered portion (312) interposed between a tail (336) on the latch and an arm (316) connected to said belt shifter, substantially as described.

5. In an organized machine, the combination of a driving shaft and mechanism for connecting the shaft to and disconnecting it from the source of power, comprising a shifting member and means for moving said member in opposite directions and for then maintaining it automatically in positions respectively with said shaft either connected to or disconnected from the source of power, said means including a latch and a treadle or lever having connections to said shifting member and to the latch, together with a stop cam on said shaft and a stop pin coöperating therewith and controlled by the shifting member, although supported independently thereof, and constructed and arranged for bringing said shaft and machine to rest in a predetermined position.

6. A mechanism of the class described, having, in combination, a shaft, a shifter for throwing the power on and off, a stop cam on the shaft, a stop member mounted to yield radially of the shaft and also mounted for movement laterally into and out of the path of the cam, a spring for moving the shifter and stop member to throw off the power and stop the shaft, a locking device for locking the shifter and stop member in position against the force of the spring while the power is thrown on, a treadle, and connections whereby the movement of the treadle in one direction moves the stop member and shifter to release the shaft, and throw on the power and the movement of the treadle in the opposite direction releases the locking device.

7. A mechanism of the class described, having, in combination, fast and loose pulleys, a belt shifter, a spring for operating the shifter to shift the belt on to the loose pulley, an actuator for moving the shifter against the tension of the spring to shift the belt on to the fast pulley, a lock for automatically locking the actuator in position with the belt on the fast pulley, a treadle, and connections between the treadle, actuator and lock whereby movement of the treadle in one direction shifts the belt to the fast pulley and movement of the treadle in the other direction releases the lock.

8. A mechanism of the class described, having, in combination, fast and loose pulleys, a belt shifter, a spring for operating the shifter to shift the belt to the loose pulley, an actuator arm connected with the belt shifter for moving it against the tension of the spring to shift the belt on to the fast pulley, a lock for automatically locking the actuator arm in position with the belt on the fast pulley, a treadle mounted for movement in opposite directions by the operator, and connections between said treadle, said actuator arm and said lock through which the movement of the treadle by the operator in one direction shifts the belt on to the fast pulley, and movement of the treadle by the operator in the opposite direction releases the lock.

9. A mechanism of the class described, having, in combination, a shaft, a driver therefor, a shifter the movement of which is transmitted to the driver to throw the power on and off, stopping devices, automatically operated means for shifting the stopping devices into stopping relation, a treadle and connections for operating the shifter and stopping devices to release the shaft and throw on the power, means for locking the stopping devices, and means for effecting the unlocking movement of the locking means by the treadle.

10. A mechanism of the class described, having, in combination, a shaft, a driver therefor, a spring actuated shifter the movement of which is transmitted to the driver to throw the power on and off, a spring actuated stop member, a coöperating stop on the shaft, a treadle for operating the stop member and shifter to release the shaft and throw on the power, a locking device for locking the shifter and stop member while the power is on, and means for effecting the unlocking movement of the locking device by the treadle.

11. A mechanism of the class described, having, in combination, a shaft, a driver therefor, a shifter the movement of which is transmitted to the driver to throw the power on and off, a spring for moving the shifter in one direction, a treadle connected to move the shifter against the action of the spring, a latch for holding the shifter in position when moved by the treadle, and connections between the treadle and latch for operating the latch to release the shifter.

12. A mechanism of the class described, having, in combination, a shaft, a driver therefor, a shifter for connecting the driver with and disconnecting it from the shaft, a spring for moving the shifter in one direction, a latch for holding the shifter in position when moved against the action of the spring, a treadle constructed and arranged to remain in either one of two positions until moved therefrom by the operator, and connections between the treadle, shifter and latch whereby movement of the treadle into one position by the operator moves the shifter against the action of the spring and movement of the treadle by the operator into another position operates the latch to release the shifter.

In testimony whereof I have signed my name to this specification in the presence of two subscribing witnesses.

GEORGE S. HILL.

Witnesses:
CHESTER E. ROGERS,
JOHN H. RIGBY.

Copies of this patent may be obtained for five cents each, by addressing the "Commissioner of Patents, Washington, D. C."